Dec. 27, 1927.  J. E. THORNTON  1,654,391
OPTICAL SYSTEM FOR CAMERAS, CINEMATOGRAPH PROJECTORS,
AND SIMILAR APPARATUS
Filed Feb. 1, 1927  2 Sheets-Sheet 1
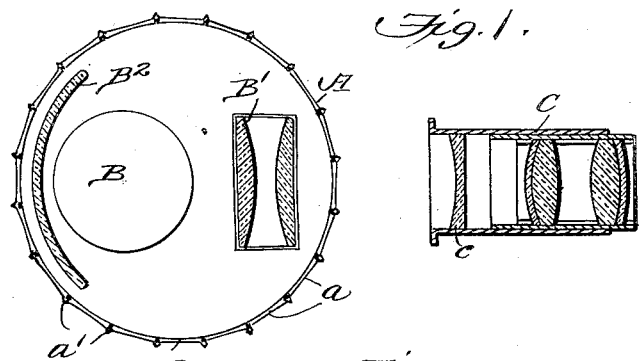
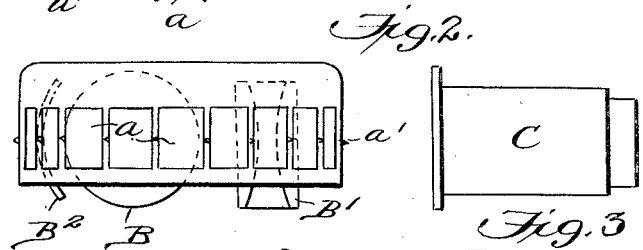
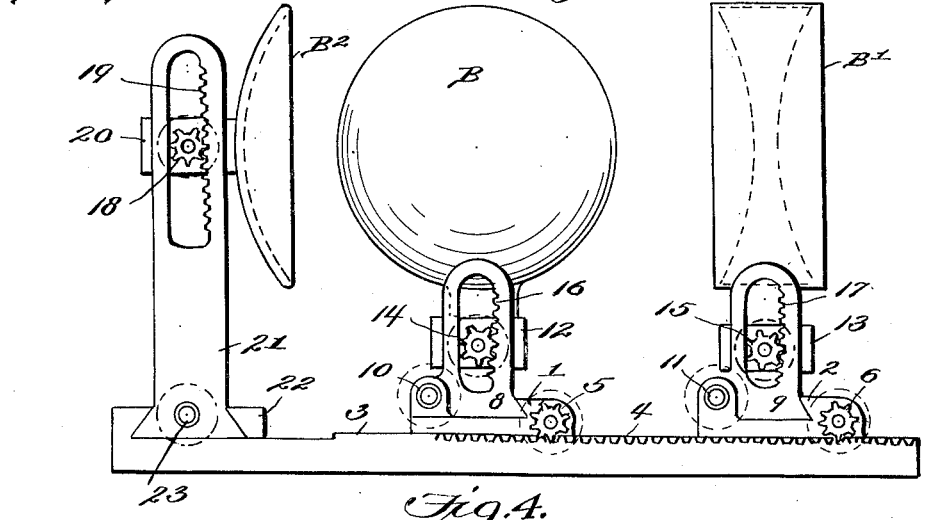
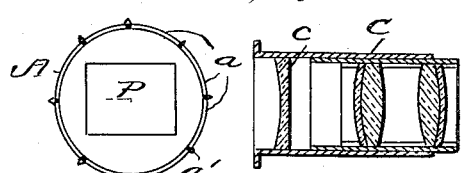
Inventor
John Edward Thornton
By  *signature*
Attorney Dec. 27, 1927.  1,654,391
J. E. THORNTON
OPTICAL SYSTEM FOR CAMERAS, CINEMATOGRAPH PROJECTORS,
AND SIMILAR APPARATUS
Filed Feb. 1, 1927    2 Sheets-Sheet 2
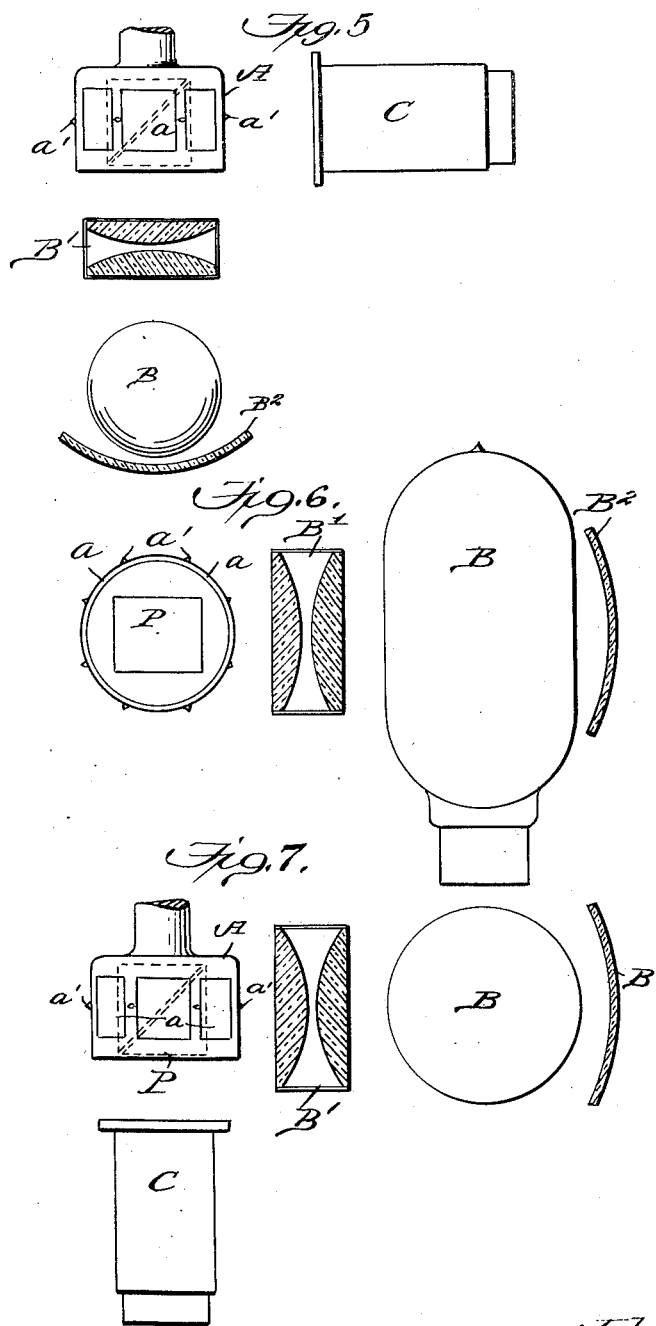
Inventor
John Edward Thornton
By
Attorney Patented Dec. 27, 1927.

1,654,391

UNITED STATES PATENT OFFICE.

JOHN EDWARD THORNTON, OF WEST HAMPSTEAD, LONDON, ENGLAND.

OPTICAL SYSTEM FOR CAMERAS, CINEMATOGRAPH PROJECTORS, AND SIMILAR APPARATUS.

Application filed February 1, 1927, Serial No. 165,230, and in Great Britain December 11, 1925.

This invention relates to optical systems for projectors for exhibiting cinematograph (motion) pictures or stationary (series) pictures which are printed upon continuous film ribbons.

One object of the invention is the provision of a novel means for mounting a lamp, reflector and lens in conjunction with a rotary film guide, whereby space is saved, the projector made more compact, and more easily installed and operated.

The invention will be described with reference to the accompanying drawings in which:—

Fig. 1 is an elevation of the large drum and projecting lens with the illumination lamp, condenser and reflector arranged inside the drum.

Fig. 2 is a plan view of Fig. 1.

Fig. 3 is an enlarged view showing a means for mounting the lamp, condenser and a reflector inside the drum so that the lamp and condenser can be separately adjusted vertically, laterally and transversely and the reflector can be adjusted vertically and laterally.

Fig. 4 is an elevation of the small drum and projecting lens showing the illuminating lamp and condenser arranged outside the drum at the side thereof and a prism or other reflecting surface inside the drum to deflect the light through an angle of 90° so that it will pass through the film and projecting lens.

Fig. 5 is a plan view of Fig. 4.

Fig. 6 is an elevation of the small drum and projecting lens showing the illuminating lamp and condenser arranged outside the drum at the rear thereof with the projecting lens at the side of the drum and a prism or other reflecting surface inside the drum to deflect the light after passing through the film into the drum through an angle of 90° to the projecting lens.

Fig. 7 is a plan view of Fig. 6.

In the form of the invention shown in Figs. 1, 2 and 3 the mechanism for feeding, measuring and positioning the film F comprises a hollow rotating drum A of relatively large diameter arranged behind the projecting lens C. An electric filament lamp B is arranged within the drum A, a condenser $B^1$ being in front of the lamp B and a parabolic or concave mirror $B^2$ being located behind the lamp.

The drum A is formed with apertures $a$ for the passage of light, each aperture being approximately the size of a picture space and with feed teeth $a^1$ between each aperture $a$ to engage with corresponding perforations on the film. Or the feed teeth may be arranged on the margins of the margins of the drum when used with a film having perforations on its margins.

The lamp B and the condenser lens $B^1$ are mounted so that they can be moved vertically, laterally and transversely and the concave or parabolic mirror $B^2$ is mounted so that it can be moved vertically and laterally.

Two sliding members or carriers 1 and 2 for the lamp B and condenser $B^1$ respectively are mounted to slide longitudinal on the support 3 one at either side of the drum A. A rack 4 is formed on the upper forward portion of the support 3 and this rack is engaged by the pinions 5 and 6 on the members 1 and 2. Each of the members 1 and 2 is formed with a slide to receive a second sliding member 8 and 9 the latter being moved transversely by a screw 10 or 11. The bracket 12 or 13 carrying the lamp B or the condenser $B^1$ carries a pinion 14 or 15 which engages a vertical rack 16 or 17 on the members 8 or 9. The lamp B or the condenser $B^1$ is thus moved laterally by rotating the pinion 5 or 6, transversely by rotating the screw 10 or 11; and vertically by rotating the pinion 14 or 15.

Suitable locking means are preferably provided to lock the parts after adjustment.

The concave or parabolic mirror $B^2$ is carried on a bracket 20 having a pinion 18 engaging a vertical rack 19 in a pillar 21 so that it can be raised or lowered. The pillar 21 is mounted in a slide 22 in the base so that it can be moved transversely by the screw 23.

A correcting lens $c$ is arranged behind the projecting lens C to prevent distortion of the pictures upon the screen due to their being projected from the curved surface of the drum A. The curvature of the back surface of the correcting lens $c$ corresponds to the curvature of the drum A, the front surface being plane without any curvature.

In Figs. 4 and 5 a form of the invention is shown applied to a small drum A, although the same form is equally applicable to a large drum such as shown in Figs. 1 and 2. In this case the lamp B is arranged at the side of the drum A with the condenser B¹ between the lamp and the drum and a concave or parabolic mirror B² is arranged behind the lamp.

The drum A is formed with apertures $a$ for the passage of light, each aperture being approximately the size of a picture space and with feed teeth $a^1$ between each aperture $a$ to engage with corresponding perforations on the film.

A prism P or other reflecting surface is arranged inside the drum A which receives the light passing from the condenser B¹ and deflects it through an angle of 90° so that it passes through the apertures in the drum and the film to the projecting lens C.

A correcting lens $c$ is arranged behind the projecting lens C to prevent distortion of the pictures upon the screen due to their being projected from the curved surface of the drum A. The curvature of the back surface of the correcting lens $c$ corresponds to the curvature of the drum A, the front surface being plane without any curvature.

The lamp B, condenser B¹ and mirror B² may be mounted as described above so as to be adjustable.

In the form of the invention shown in Figs. 6 and 7 it is shown applied to a small drum although the same form is equally applicable to the large drum shown in Figs. 1 and 2. In this case the lamp B is arranged behind the drum A and the projecting lens C at the side of the drum. The condenser B¹ is arranged between the lamp B and the drum and a concave or parabolic mirror B² behind the lamp B. The object of this arrangement is to enable the invention to be used with larger and more powerful lamps than in the arrangements already described.

The drum A is formed with apertures $a$ for the passage of light, each aperture being approximately the size of a picture space and with feed teeth $a^1$ between each aperture $a$ to engage with corresponding perforations on the film. Or the feed teeth may be arranged on the margins of the drum when used with a film having perforations on its margins.

A prism P or other reflecting surface is arranged inside the drum which receives the light after passing through the film and the apertures in the drum and deflects it through an angle of 90° out of the drum at the side to the projecting lens C.

A correcting lens $c$ is arranged in front of the projecting lens C to prevent distortion of the pictures upon the screen due to the projection from the curved surface of the drum A. The curvature of the back surface of the correcting lens corresponds to the curvature of the drum A, the front surface being plane without any curvature.

The drum A is driven in any suitable manner.

Where the illuminating lamp B is arranged outside the drum A any desired size and form of lamp may be employed. The lamp may be large say 400 to 800 watts when it is desired to project a large picture in a large hall; or it may be of smaller size when it is desired to project a small picture in a small room such as in the home, for example 6 to 12 volts. In such a small drum the prism just fits within the drum and enables the film pictures to be perfectly illuminated. The drum is very light and noiseless when operated by a Maltese wheel to give the desired intermittent movement.

The illuminating lamp, when located outside the drum, may be an ordinary electric filament lamp, an electric arc lamp or a gas or similar incandescent lamp.

What I claim as my invention and desire to protect by Letters Patent is:—

A lamp, condensing lens and reflector carrier for motion picture projectors, including a support, the forward portion of which is provided with rack teeth, two carriers mounted upon the forward portion, a rotatable gear member attached to each carrier for engaging the rack to longitudinally adjust the carrier upon the support, each carrier being provided with an elongated slot one edge of which is toothed, a vertical carrying bracket mounted in said slot, a gear carried by the same for engaging the teeth of the slot to vertically adjust the bracket, a condensing lens carried by one of said vertically adjustable members, and a lamp carried by the other, a pillar slidably connected to the support at the rear of the rack teeth, said pillar being provided with an elongated slot, one edge of which is provided with rack teeth, a bracket mounted in the pillar, a pinion carried by the bracket for engaging the rack teeth whereby the bracket is vertically adjustable in the pillar, and a reflector carried by the bracket.

In testimony whereof I have hereunto set my hand.

JOHN EDWARD THORNTON.